US009891739B2

(12) United States Patent
Moller et al.

(10) Patent No.: US 9,891,739 B2
(45) Date of Patent: Feb. 13, 2018

(54) DEFORMABLE TOUCH AND STRAIN SENSOR

(71) Applicant: Microsoft Technology Licensing, LLC, Redmond, WA (US)

(72) Inventors: Christian N. Moller, Redmond, WA (US); James David Holbery, Bellevue, WA (US); Andrew L. Fassler, Pittsburgh, PA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/056,247

(22) Filed: Feb. 29, 2016

(65) Prior Publication Data

US 2017/0249041 A1    Aug. 31, 2017

(51) Int. Cl.
G06F 3/041     (2006.01)
G06F 3/01      (2006.01)
G06F 3/044     (2006.01)
G02B 27/01     (2006.01)

(52) U.S. Cl.
CPC ......... *G06F 3/0414* (2013.01); *G02B 27/017* (2013.01); *G06F 3/012* (2013.01); *G06F 3/016* (2013.01); *G06F 3/044* (2013.01)

(58) Field of Classification Search
CPC  G01L 1/22; G01L 5/228; G01L 1/205; A61H 2201/165; A61H 2201/5058; B81C 1/0019; H05K 1/0283; B81B 3/0018; G06F 2203/04103; A61B 2562/0261
See application file for complete search history.

(56) References Cited

U.S. PATENT DOCUMENTS

| | | |
|---|---|---|
| 6,360,615 B1 | 3/2002 | Smela |
| 8,187,795 B2 | 5/2012 | Jain et al. |
| 8,587,493 B2 | 11/2013 | Dickey et al. |
| 2010/0033196 A1 | 2/2010 | Hayakawa et al. |

(Continued)

FOREIGN PATENT DOCUMENTS

WO       2014204323 A1     12/2014
WO   WO 2014204323 A1 *   12/2014   ......... A41D 13/1281

(Continued)

OTHER PUBLICATIONS

Wang, X. et al., "Transparent, stretchable, carbon-nanotube-inlaid conductors enabled by standard replication technology for capacitive pressure, strain and touch sensors," Journal of Materials Chemistry A, vol. 1, No. 11, Jan. 25, 2013, 7 pages.

(Continued)

*Primary Examiner* — Mirza Alam
(74) *Attorney, Agent, or Firm* — Alleman Hall Creasman & Tuttle LLP (57) ABSTRACT

Various examples of deformable sensors are disclosed. In one example, a deformable sensor comprises a ground electrode comprising a plurality of spatially separated lines, and a set of individually-indexed signal channels interdigitated with the spatially separated lines, each individually-indexed signal channel comprising a stretchable conductive path encapsulated in an elastomeric material.

20 Claims, 8 Drawing Sheets

(56) References Cited

U.S. PATENT DOCUMENTS

| | | | | |
|---|---|---|---|---|
| 2010/0231543 | A1* | 9/2010 | Momose | G06F 3/0412 345/173 |
| 2012/0075069 | A1* | 3/2012 | Dickey | H01Q 1/364 340/10.1 |
| 2012/0118066 | A1 | 5/2012 | Majidi et al. | |
| 2013/0041235 | A1* | 2/2013 | Rogers | A61B 5/6867 600/306 |
| 2013/0312541 | A1 | 11/2013 | Majidi et al. | |
| 2013/0320467 | A1* | 12/2013 | Buchanan | G01N 29/022 257/419 |
| 2014/0238153 | A1 | 8/2014 | Wood et al. | |
| 2015/0169005 | A1* | 6/2015 | Yanagida | G06F 1/169 345/173 |

FOREIGN PATENT DOCUMENTS

| | | |
|---|---|---|
| WO | 2015117125 A1 | 8/2015 |
| WO | 2015157272 A1 | 10/2015 |

OTHER PUBLICATIONS

Tai, Y. et al., "A highly sensitive, low-cost, wearable pressure sensor based on conductive hydrogel spheres," Nanoscale, vol. 7, No. 35, Aug. 4, 2015, 8 pages.

Tabatabai, et al., "Liquid-Phase Gallium-Indium Alloy Electronics with Microcontact Printing", In Journal of Langmuir, vol. 29, Issue 20, May 9, 2013, 3 pages.

Cotton, et al., "A Multifunctional Capacitive Sensor for Stretchable Electronic Skins", In Proceedings of IEEE Sensors Journal, vol. 9, Issue 12, Dec. 2009, pp. 2008-2009.

Fassler, et al., "Soft-Matter Capacitors and Inductors for Hyperelastic Strain Sensing and Stretchable Electronics", In Journal of Smart Materials and Structures, vol. 22, Issue 5, Apr. 11, 2013, 3 pages.

Choi, et al., "Improved Capacitive Pressure Sensors Based on Liquid Alloy and Silicone Elastomer", In Proceedings of IEEE Sensors Journal, vol. 15, Issue 8, Aug. 2015, pp. 4180-4181.

Park, et al., "Hyperelastic Pressure Sensing with a Liquid-Embedded Elastomer", In Journal of Micromechanics and Microengineering, vol. 20, No. 12, Nov. 29, 2010, pp. 1-6.

Yaoa, et al., "Wearable Multifunctional Sensors Using Printed Stretchable Conductors Made of Silver Nanowires", In Journal of Nanoscale, vol. 6, Issue 4, Dec. 5, 2013, pp. 2345-2352.

Hu, et al., "Elastomeric Transparent Capacitive Sensors based on an Interpenetrating Composite of Silver Nanowires and Polyurethane", In Journal of Applied Physics Letters, vol. 102, Issue 8, Feb. 2013, 6 pages.

Wissman, et al., "Soft-Matter Electronics with Stencil Lithography", In Journal of IEEE Sensors, Nov. 3, 2013, 4 pages.

* cited by examiner

DEFORMABLE TOUCH AND STRAIN SENSOR

BACKGROUND

An electronic device may be configured to interface with a human being in various ways. Some electronic devices may include one or more mechanical switches, which the user actuates via touch pressure. Other devices use resistive or capacitive touch sensing, or non-contact approaches to receive user input. Still other devices may include one or more electrodes coupled electrically to the user's skin.

SUMMARY

Examples of deformable sensors that may be incorporated into a variety of devices and articles are disclosed. In one example, a sensor comprises a ground electrode comprising a plurality of spatially separated lines, and a set of individually-indexed signal channels interdigitated with the spatially separated lines, wherein each signal channel comprises a stretchable conductive path encapsulated in an elastomeric material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Tactile sensors may be incorporated into a variety of devices, in order to provide touch input sensing, strain and/or pressure sensing, or other functions. These sensors are often relatively rigid, limiting the types of devices in which the sensors can be incorporated. Further, these sensors may be limited to providing one type of output, such as touch input identification or strain sensing.

Examples are disclosed herein that relate to a dual-function capacitive touch and strain sensor including an array of signal channels each comprised of a stretchable conductive path encapsulated in an elastomeric material. In some example, the conductive path may be comprised of a conductive material that is liquid at room temperature. Thus, due to the liquid conductive material and elastomeric encapsulation, the sensor may be flexible and deformable, allowing the sensor to be incorporated in soft and/or stretchable articles, surfaces, and devices. In some examples, a sensor includes a ground electrode having multiple, spatially separated lines, and the signal channels may be interdigitated between respective ground conductor lines, forming individually indexed sensing elements. In this manner, the stretchable conductive paths of the sensor may provide for the ability to detect the location of the touch and/or strain input along at least one dimension.

Figure 1:
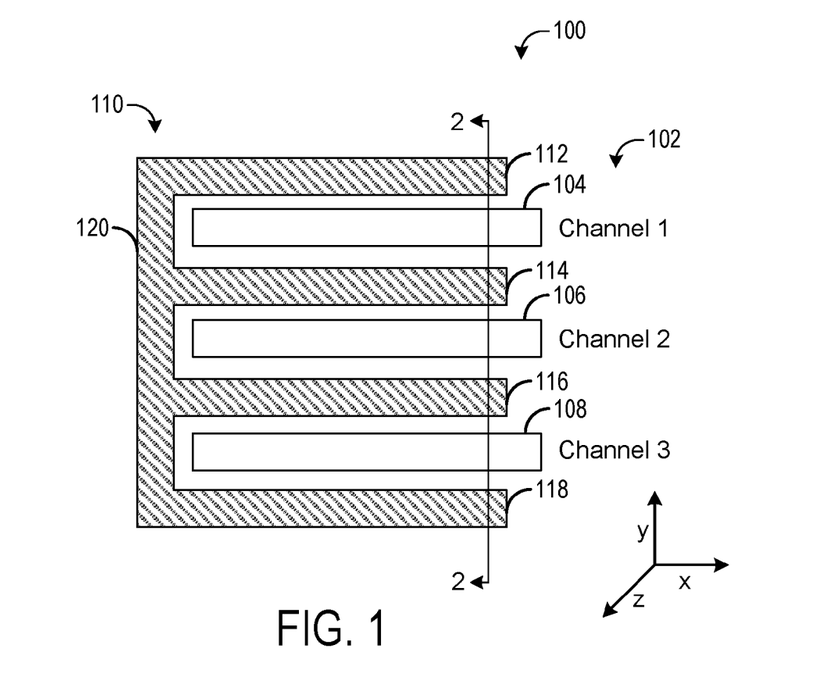
FIGS. 1 and 2 schematically show an example deformable sensor.
Figure 2:
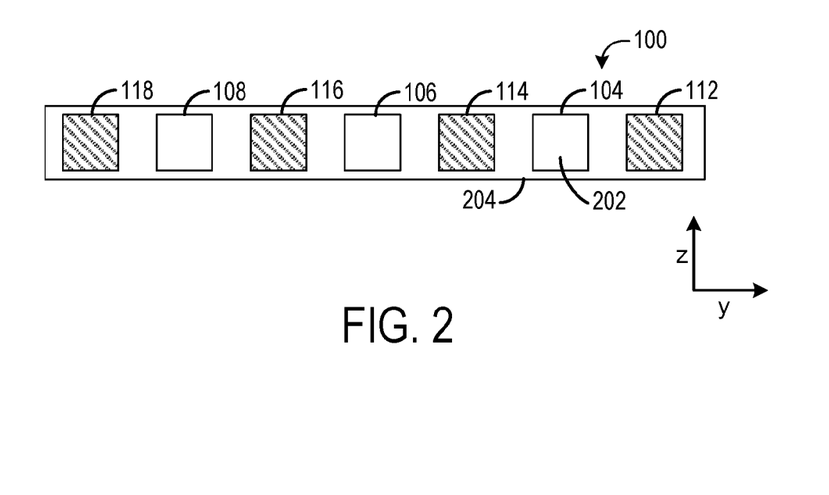

FIG. 1 shows a top view of an example deformable sensor 100 comprising a set of signal channels 102 and a ground electrode 110 as viewed along the z-axis of the Cartesian coordinate system illustrated in FIG. 1. FIG. 2 is a cross-sectional view of the deformable sensor 100 taken along the line 2-2 as viewed along the y-axis. Connections to external circuitry are omitted for clarity In the example illustrated in FIGS. 1 and 2, the deformable sensor includes three signal channels—a first channel 104, a second channel 106, and a third channel 108. The ground electrode 110 includes four spatially-separated lines, a first line 112, second line 114, third line 116, and fourth line 118. Other examples may have either more or fewer signal channels without departing from the scope of this disclosure.

In the depicted example, each line of the ground electrode as well as each signal channel extends in a common direction along the x-axis of FIG. 1, and the lines are spatially separated along a direction orthogonal to the direction that the ground lines extend, e.g., the y-axis. The set of signal channels 102 is interdigitated with the lines of the ground electrode 110, such that the first channel 104 is located intermediate the first line 112 and second line 114, the second channel 106 is located intermediate the second line 114 and the third line 116, and the third channel is located intermediate the third line 116 and the fourth line 118.

Each line of the ground electrode is coupled to a common ground 120. In contrast, each signal channel of the set of signal channels is electrically separate from other signal channels.

Each signal channel comprises a stretchable conductive path encapsulated in a resiliently deformable host material. As shown in FIG. 2, first channel 104 includes a conductive material 202 encapsulated in a deformable host material 204. The other signal channels are similarly structured. As shown, the conductive material of each signal channel as well as each line of the ground electrode is encapsulated in a unitary piece of host material 204, which may be applied in two or more separate layers, although other configurations are possible. It is be understood that the deformable sensor 100 of FIGS. 1 and 2 is illustrated schematically, and that a deformable sensor and individual lines thereof may have different dimensions, spacings, or other configuration than that shown.

Figure 11:
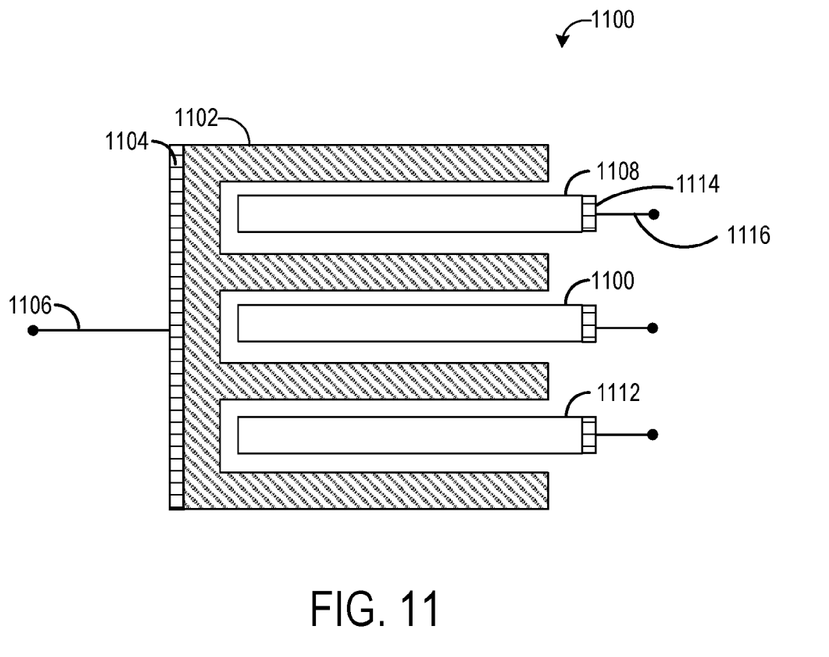
FIG. 11 schematically shows another example sensor.

The conductive material 202 may be resiliently deformable, enabling sensor 100 to be worn over a flexible body part or located in soft goods, for example. In some examples, the conductive material 202 may comprise eutectic gallium indium (EGaIn). With a conductivity of $3.4 \times 10^6$ siemens per meter (S/m) and a melting point of 15.5° C., EGaIn is a liquid conductor at room temperature and at human skin and body temperature. An EGaIn conductive path will conform to its container (the deformable host material) at these temperatures, thereby maintaining the flexibility of the host material. In other examples, the conductive material 202 may comprise another conductive liquid alloy or a multiphase material set capable of conducting electricity. As an example of a multiphase material set, a solid conductor, such as conductive wire or foil, may be used to form the electrode lines, and eGaIn or other liquid conductive alloy may be used to form an end connection between the electrode lines and a conductor leading to an exterior of the sensor, thereby forming a conductive path with a solid portion and a liquid portion. An example of such a configuration is shown as sensor 1100 in FIG. 11, where the solid conductor of the common ground electrode lines is shown at 1102, a liquid conductor for the common ground is shown at 1104, and a connector to an outside circuit for the common ground is shown at 1106. Similar structures may be used for the signal channels 1108, 1110 and 1112, as shown by liquid conductor 1114 and connector 1116.

The host material 204 is electrically insulating, and resiliently stretchable, bendable, and/or depressible, and may be formed from any suitable material or materials. In some examples, the host material may be formed at least partially from a soft, deformable, elastomeric polymer, such as silicone or latex. Such materials may be capable of linear extension of 10% or greater of a relaxed length, wherein the linear extension may exceed 2× a relaxed length in some examples. In other examples, various soft rubbers and/or thermoplastic materials may be used. When a finger or other body part comes in proximity or contacts sensor 100, the capacitance of any affected signal channels changes, thereby allowing capacitive touch sensing. Further, strain applied to the sensor may cause the sensor to undergo deformation, which also may be measured via change in capacitance.

The sensor 100 may have any suitable thickness. In some implementations, the sensor may have a thickness of one millimeter or less. In other implementations, the sensor may be thicker. While each ground electrode line and signal channel is illustrated in FIG. 2 as having similar cross-sectional dimensions (e.g., similar thicknesses and widths), in other examples the ground electrode lines and signal channels may have different cross-sectional dimensions. Further, the around electrode lines and signal channels may have any other suitable shape than that shown. For example, the ground electrode lines and signal channels may have a different cross-sectional configuration, and/or may be at least partially curved or otherwise change direction(s) along their lengths.

The sensor may be formed in any suitable manner. In some examples, a first layer of host material may first be formed (e.g. by doctor blade, spin coating, or other suitable process). Then, electrode channels may be etched (e.g. via laser ablation) or otherwise formed in the first layer of host material. Then, the electrode material (e.g. eGaIn or other suitable material or combination of materials) may be deposited in the electrode channels, and a second layer of host material may be formed to encapsulate the electrode material. In other examples, any other suitable method may be used to form the sensor.

The encapsulated electrodes may be conductively coupled with an external circuit for operating the sensor in any suitable manner. In some examples, a portion of the deformable host material may be formed with an embedded conductor that contacts the encapsulated conductor and that extends to an outside of the host material for forming an electrical connection. As more specific examples, a portion of the deformable host material may be formed with an embedded wire extending therethrough (e.g. a copper wire), an embedded conductive foil material, or with finer embedded structures, such as silver nanowires or other nanowires. In other examples, a conductive path through the host material may be formed after forming the encapsulating structure, for example, by extending a wire through the encapsulating host material and then sealing the interface between the wire and host material.

Figure 3:
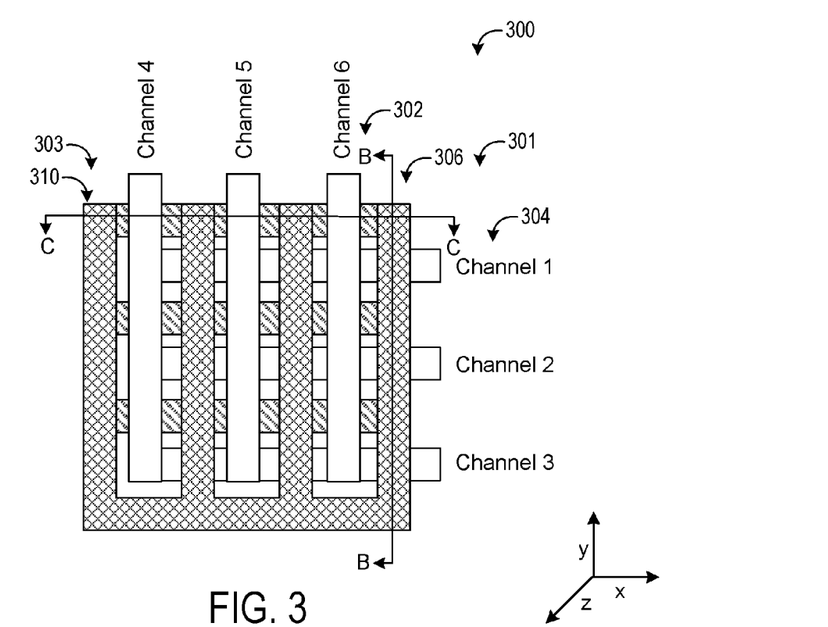
FIGS. 3-5 schematically show an example deformable sensor comprising multiple touch and strain detecting layers.
Figure 4:
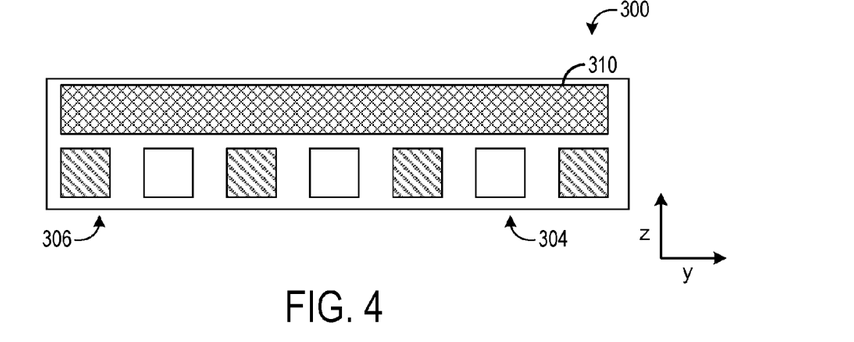
Figure 5:
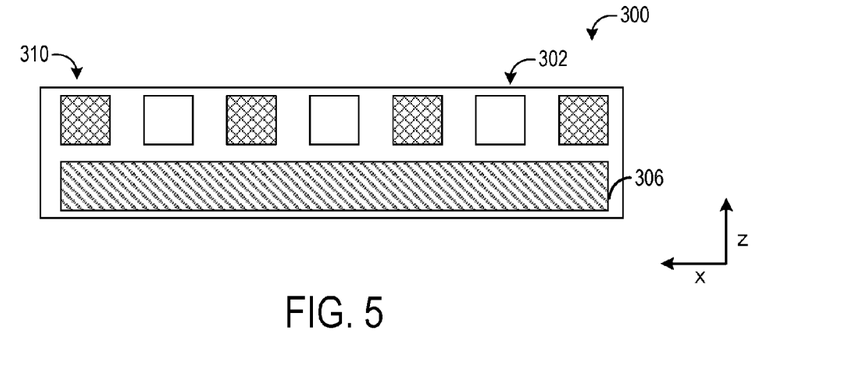

Sensor 100 allows for touch/strain signals to be positionally resolved along one dimension, e.g., along the y-axis of FIG. 1. In other examples, a deformable sensor may include multiple layers of signal channels interdigitated with lines of a ground electrode. FIGS. 3-5 illustrate an example of a deformable sensor 300 configured to detect touch/strain in two dimensions, wherein FIG. 3 is a top view of sensor 300 along the z-axis. FIG. 4 is a schematic cross-sectional view of sensor 300 taken along the line B-B as viewed along the x-axis, and FIG. 5 is a schematic cross-sectional view of sensor 300 taken along the line C-C as viewed along the y-axis.

Sensor 300 includes a first layer 301 that is similar to sensor 100, in that it includes a set of signal channels interdigitated with a plurality of spatially-separated ground lines of a ground electrode. The first layer includes a set of signal channels 304 including three signal channels and a plurality of spatially separated ground electrode lines 306 including four around lines that extend along the x-axis. Sensor 300 may be formed by repeating, for each individual sensor layer, the above-described process for forming sensor 100, or in any other suitable manner.

Sensor 300 further includes a second layer 303 positioned vertically above the first layer 301. The second layer is similar to the first layer, and thus includes a set of signal channels 302 having three signal channels (channel 5, channel 6, and channel 7) interdigitated with four spatially separated lines 310 of a ground electrode. The ground lines and signal channels of the second layer may extend in a different direction than the ground lines and signal channels of the first layer. As shown, the ground lines and signal channels of the second layer extend along the y-axis, and the ground lines are spatially separated along the x-axis, but may extend in any other suitable direction.

As shown, the conductive material of each signal channel as well as each line of the ground electrode is encapsulated in a unitary piece of host material (which may be formed as two or more separate layers), although other configurations are possible. Further, it is be understood that the deformable sensor 300 of FIGS. 3-5 is illustrated schematically, and as such the deformable sensor may have different dimensions, spacings, or other configuration than that shown.

A resiliently deformable sensor according to the present disclosure may be implemented in any suitable device or article. Examples include, but are not limited to, wearable computing devices such as head-mounted display devices, band devices, such as watches, flexible/stretchable articles such as fabric (e.g., in clothing, furniture, etc.), bandages, orthotics, etc., and hand-held devices such as phones or tablet computers.

Figure 6:
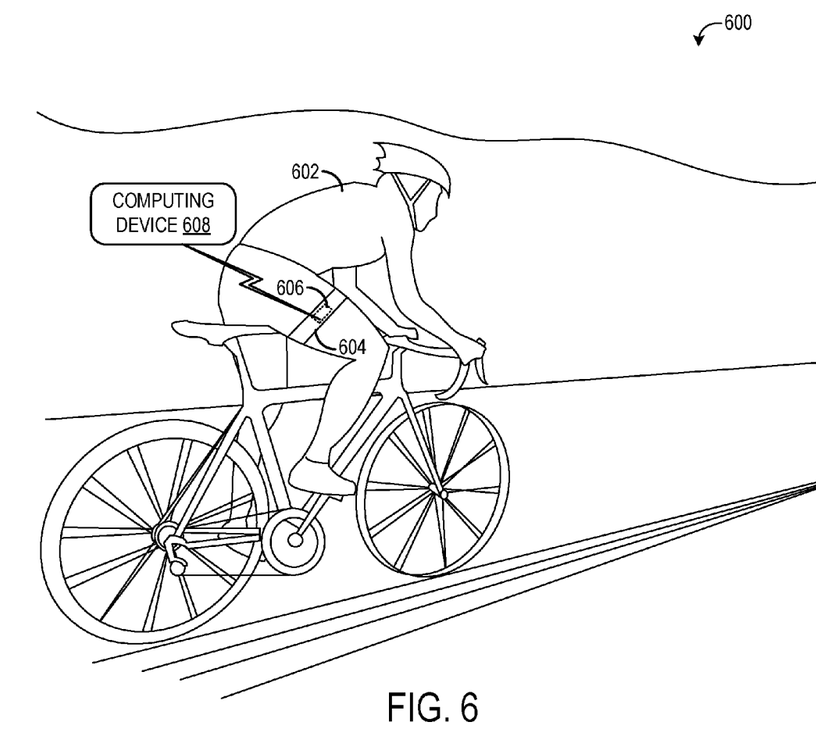
FIG. 6 shows a first example stretchable article comprising a deformable sensor.

FIG. 6 illustrates an example of a wearable article in the form of a band 604 including a deformable sensor 606. Band 604 is configured to be worn around a body part of a user 602, for example around a leg of user 602 as shown in FIG. 6. Deformable sensor 606 may be sensor 100 of FIG. 1 or sensor 300 of FIG. 3, and thus may configured to detect strain that may be induced by onset or recession of muscle swelling, muscle flexing, heartbeat, or other suitable body movement or function. Band 604 may be formed from any suitable material, including but not limited to fabrics, flexible plastics, and elastomeric materials. Sensor 606 may be mounted on an exterior of band 604, or may be incorporated into an interior of band 604. Sensor 606 may be configured to provide output to an operatively-coupled computing device 608 via a wired or wireless connection. Band 604 may take the form of a thin, belt-like strap, or a larger, sleeve-like enclosure.

Sensor 606 may output information usable by computing device 608 to monitor a suitable condition of user 602, such as a level of muscle swelling, and notify user 602 and/or other users of the condition, for example to notify user 602 that his or her muscle is undergoing swelling so that user 602 can terminate his or her activity to prevent further injury. Similarly, such a sensor also may be used to monitor an injured muscle for recovery, e.g. by detecting a reduction in swelling of the injured muscle. In other examples, rather than be maintained in close contact with the leg of user 602 via band 604, sensor 606 may instead be incorporated into a pair of shorts, pants, shirt, socks, shoe, hat, or other article of clothing configured to have a suitably close fit to a body part.

Figure 7A:
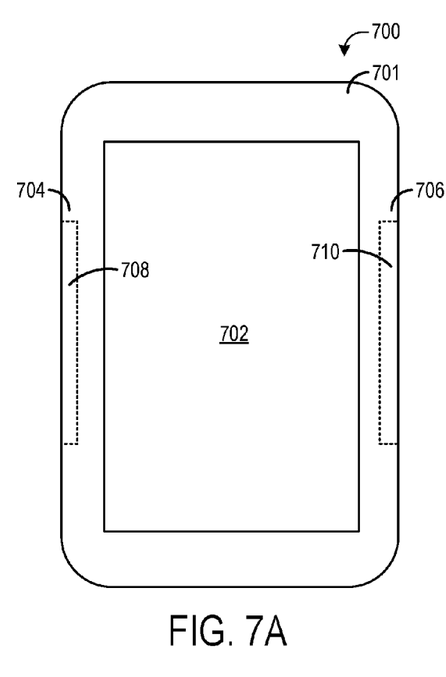
FIGS. 7A and 7B show a first example device comprising a deformable sensor.
Figure 7B:
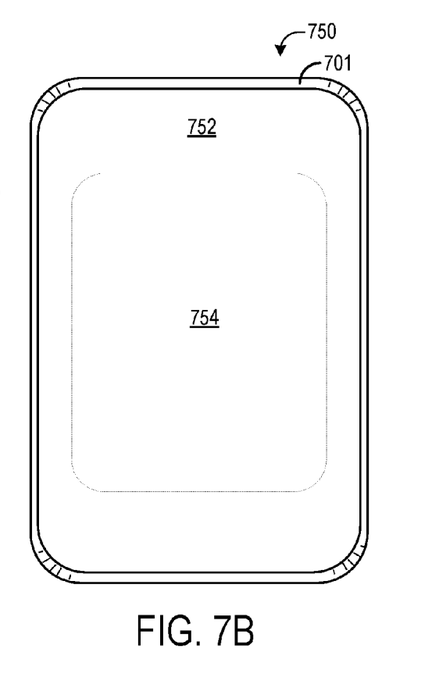

A sensor according to the present disclosure also may be incorporated into a computing device. FIGS. 7A and 7B illustrate an example of a hand-held computing device 701 in the form of a tablet computing device. FIG. 7A is a front view 700 of the hand-held computing device 701 and FIG. 7B is a back view 750 of the hand-held computing device 701. The hand-held computing device 701 may include a display 702 configured to display user interface controls, images, etc., responsive to instructions executed by a process of the hand-held computing device (not shown).

Various surfaces of the hand-held computing device 701 may be comprised of soft, deformable, and/or flexible material. For example, a first side surface 704 and second side surface 706 of the front of the hand-held computing device, as well as a back surface 752 of hand-held computing device 701, may be at least partially formed from an elastomeric or other resiliently deformable material. As such, one or more resiliently deformable sensors as disclosed herein may be incorporated into one or more locations of the soft exterior surfaces. In the example of FIG. 7A, a first sensor 708 is incorporated in the material of the first side surface 704 and a second sensor 710 may be incorporated in the material of second side surface 706. As shown in FIG. 7B, a third sensor 754 may be incorporated into the material of back surface 752. Sensor 100 of FIG. 1 and sensor 300 of FIG. 3 are examples of sensors that may be used for each of first sensor 708, second sensor 710, and third sensor 754. In one non-limiting example, first sensor 708 and second sensor 710 may be configured to detect touch/strain applied to the first side surface 704 and second side surface 706 in order to measure a grip applied to hand-held computing device 701 when the device is held by a user. In such an example, a grip pressure may be used for user interface interactions, e.g. to perform a selection operation in place of a mouse click or touch screen touch. Third sensor 754 may be configured to detect touch input made to the back surface, for example. This may allow touch user inputs to be made (e.g. by controlling a cursor or other suitable user interface mechanism) without having to release a grip of the hand-held computing device 701 to use a touch screen. It will be understood that hand-held computing device 701 may include a processor and storage comprising stored instructions executable by the processor to monitor the outputs of the sensors for such interactions, and to perform an action on the hand-held computing device responsive to a touch input detected by one or more of the sensors. Example hardware configurations are described in more detail below.

Figure 8:
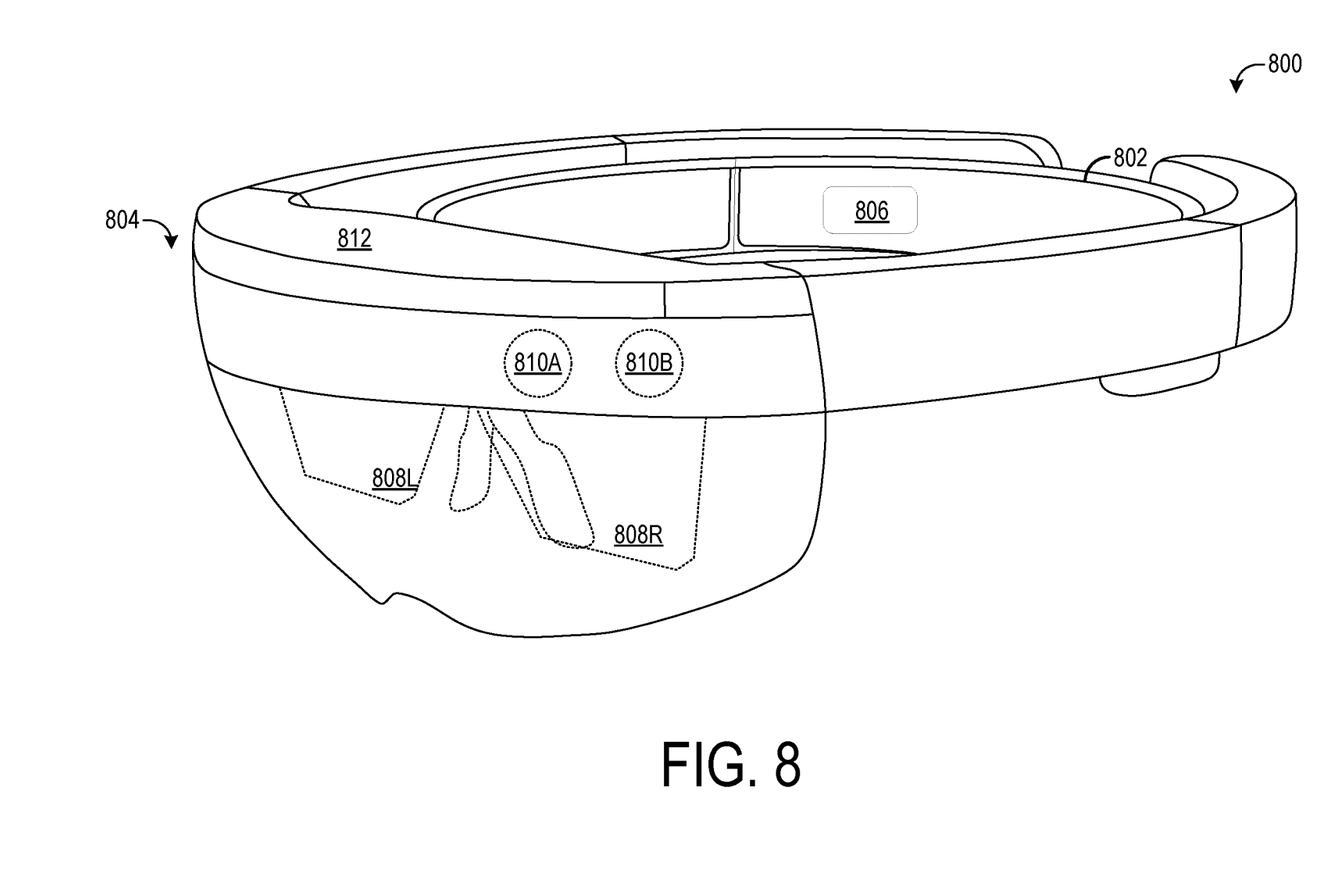
FIG. 8 shows a second example device comprising a deformable sensor.

FIG. 8 illustrates an example of a wearable computing device in the form of an example head-mounted display device (HMD) 800. The illustrated HMD includes an adjustable band 802 that supports componentry 804 of the HMD, including stereoscopic, see-through display componentry, configured to be positioned close to a user's eyes. Accordingly, the HMD may be used in augmented-reality applications, where real-world imagery is admixed with virtual display imagery. Componentry 804 may be relatively heavy. Thus, to increase comfort of a wearer of HMD 800, band 802 may be made of or include an outer layer of soft, deformable, and/or flexible material, such as fabric or an elastomeric material.

HMD 800 includes separate right and left display panels 808R/808L, cameras 810A/810B, and a controller 812. The controller is operatively coupled to the display panels, cameras, and other componentry. The controller includes logic and associated computer memory configured to provide image signal to the display panels, to receive video from the cameras, and to enact various control processes of the HMD. The controller may include a wired or wireless interface for exchanging data with a remote computer system, and/or receiving power from an external power source.

In order to maintain displayed images in desired registration with real-world objects, it may be desirable to maintain the display panels at a fixed location relative to a wearer's eyes, even as the wearer moves his or her head, thus dictating that adjustable band 802 be maintained in a relatively tight position around the head of the wearer. However, if band 802 is adjusted to a position that is too tight, strain may be placed on the wearer's head, leading to discomfort over time.

Thus, band 802 may include a deformable sensor 806 configured to detect a tension of band 802 on a wearers head, e.g. by strain detection. Sensor 100 of FIG. 1 and sensor 300 of FIG. 3 are examples of sensors that may be used as deformable sensor 806. If the level of tension exceeds a designated level, controller 812 may be configured to output a notification (via the display panels, for example) instructing the wearer to loosen band 802. In other examples, if the level of tension is less than a second threshold, controller 812 may be configured to output a notification (via the display panels, for example) instructing the wearer to tighten band 802. It will be understood that HMD 800 is presented as an example of a wearable computing device, and that one or more sensors as disclosed herein may be used on any other suitable wearable computing device.

Figure 9:
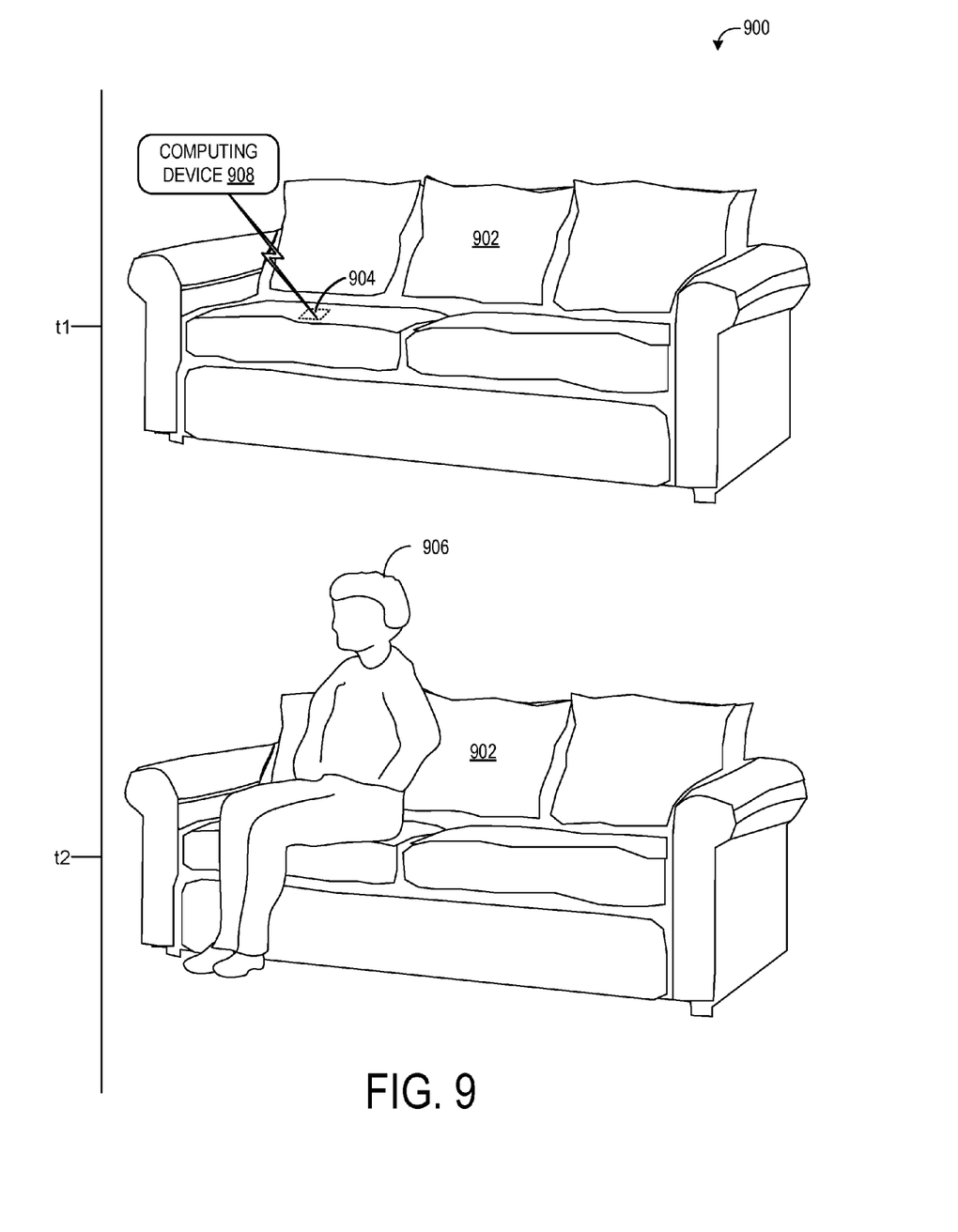
FIG. 9 shows a second example article comprising a deformable sensor.

FIG. 9 illustrates an example of an article in the form of a couch 902 including a deformable sensor 904. Sensor 100 of FIG. 1 and sensor 300 of FIG. 3 are examples of sensor 904. Sensor 904 may be incorporated into the exterior surface of a cushion of couch 902. Specifically, FIG. 9 is a timeline 900 illustrating a user 906 applying strain the couch, as detected by sensor 904. At time t1, couch 902 is currently unused. As such, no strain is detected by sensor 904. At time t2, user 906 sits on the cushion including sensor 904. As a result, sensor 904 detects the strain placed on the couch by user 906. Sensor 904 may be operatively coupled to a computing device 908 via a wired or wireless connection. Computing device 908 may be a suitable device, such as a wearable computing device of user 906, a home entertainment system, and/or other suitable device. The output from sensor 904 may be used by computing device 908 to detect that user 906 is sitting on couch 902, for example. By detecting that user 906 is sitting on couch 902, various actions may be taken, including but not limited to automatically activating a display device (e.g., television) located in the environment or notifying user 906 when he or she has sat for a threshold duration, order to encourage user 906 to stand up. Further, sensor 904 may be incorporated into other suitable devices or articles, including but not limited to car seats (e.g., in order to detect presence of a passenger in a seat), cribs, beds, and the like.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
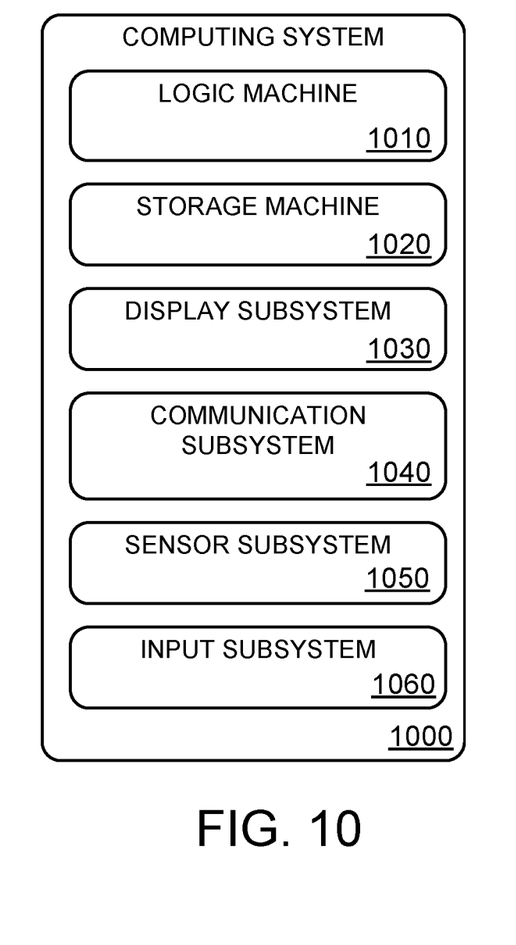
FIG. 10 schematically shows an example computing device.

FIG. 10 schematically shows a non-limiting embodiment of a computing system 1000 that may enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices. Computing system 1000 is a non-limiting example of computing device 608, hand-held computing device 701, HMD 800, and/or computing device 908 described above. Further, local and/or remote computing systems configured to receive output from the deformable sensor of the disclosure may also be non-limiting examples of computing system 1000.

Computing system 1000 includes a logic machine 1010 and a storage machine 1020. Computing system 1000 may optionally include a display subsystem 1030, input subsystem 1060, communication subsystem 1040, sensor subsystem 1050, and/or other components not shown in FIG. 10.

Logic machine 1010 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1020 includes one or more physical devices configured to hold instructions executable by the logic machine to implement the methods and processes described herein. When such methods and processes are implemented, the state of storage machine 1020 may be transformed—e.g., to hold different data.

Storage machine 1020 may include removable and/or built-in devices. Storage machine 1020 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1020 may include volatile, nonvolatile, dynamic, static, read/write, read-only, random-access, sequential-access, location-addressable, file-addressable, and/or content-addressable devices.

It will be appreciated that storage machine 1020 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1010 and storage machine 1020 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1030 may be used to present a visual representation of data held by storage machine 1020. This visual representation may take the form of a graphical user interface (GUI). As the herein described methods and processes change the data held by the storage machine, and thus transform the state of the storage machine, the state of display subsystem 1030 may likewise be transformed to visually represent changes in the underlying data. Display subsystem 1030 may include one or more display devices utilizing virtually any type of technology. Such display devices may be combined with logic machine 1010 and/or storage machine 1020 in a shared enclosure, or such display devices may be peripheral display devices.

When included, input subsystem 1060 may comprise or interface with one or more user-input devices such as a keyboard, mouse, touch screen, or game controller. In some embodiments, the input subsystem may comprise or interface with selected sensors of sensor subsystem 1050, such as natural user input (NUI) componentry. Such componentry may be integrated or peripheral, and the transduction and/or processing of input actions may be handled on- or off-board. Example NUI componentry included in sensor subsystem 1050 may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Sensor subsystem 1050 may include one or more deformable sensors, such as sensor 100 or sensor 300 described above.

When included, communication subsystem 1040 may be configured to communicatively couple computing system 1000 with one or more other computing devices. Communication subsystem 1040 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

Another example provides a sensor comprising a ground electrode comprising a plurality of spatially separated lines, and a set of individually-indexed signal channels interdigitated with the spatially separated lines, each signal channel comprising a stretchable conductive path encapsulated in an elastomeric material. Such an example additionally or alternatively may include the stretchable conductive path comprising eutectic gallium indium. Such an example may additionally or alternatively further include a conductor extending from an exterior of the elastomeric material of a first signal channel of the set of individually-indexed signal channels, through the elastomeric material of the first signal channel, and contacting the eutectic gallium indium. The conductor may additionally or alternatively comprise one or more of silver nanowires and copper wire. The elastomeric material may additionally or alternatively comprise one or more of a silicone elastomer and a latex elastomer. The stretchable conductive path may additionally or alternatively comprise a solid conductive portion and a liquid conductive portion. Such an example may additionally or alternatively include the sensor being a first sensor, and may further include a second sensor positioned vertically above the first sensor and comprising a second set of individually-indexed signal channels. Such an example may additionally or alternatively include the sensor being incorporated into a wearable computing device. Such an example may additionally or alternatively include the sensor being incorporated into a hand-held computing device. Such an example may additionally or alternatively include the sensor being incorporated into a fabric article. Any or all of the above-described examples may be combined in any suitable manner in various implementations.

Another example provides for a stretchable wearable article comprising a sensor coupled with the stretchable, wearable article, the sensor including a ground electrode comprising a plurality of spatially separated lines, and a set of individually-indexed signal channels interdigitated with the spatially separated lines, each signal channel comprising a stretchable conductive path encapsulated in elastomeric material. Such an example additionally or alternatively includes the article comprising fabric and the sensor being incorporated in the fabric. Such an example additionally or alternatively includes the sensor being configured to output information usable by an operatively-coupled computing device to determine a condition of a body part of a wearer of the article. Such an example additionally or alternatively includes the stretchable conductive path comprising eutectic gallium indium and the elastomeric material comprising silicone. Any or all of the above-described examples may be combined in any suitable manner in various implementations.

Another example provides for a computing device comprising a soft, exterior surface; and a sensor positioned relative to the soft, exterior surface such that deformation pressure on the soft, exterior surface is detectable by the sensor, the sensor comprising a plurality of spatially separated lines, and a set of individually-indexed signal channels interdigitated with the spatially separated lines, each signal channel comprising a stretchable conductive path encapsulated in an elastomeric material. Such an example additionally or alternatively includes the stretchable conductive path comprising eutectic gallium indium, and the elastomeric material comprising silicone. Such an example additionally or alternatively further includes a controller and a display device, the soft, exterior surface is a surface of an adjustable band configured to mount the controller and display device, and the sensor is located in the soft, exterior surface. Such an example additionally or alternatively includes the controller being configured to receive output from the sensor and output a notification to a wearer of the device when a tension of the adjustable band reaches a designated level of tension, the tension of the adjustable band determined based on the output from the sensor. Such an example additionally or alternatively includes the computing device being a hand-held computing device, and the soft, exterior surface is a back surface of the hand-held computing device. Such an example additionally or alternatively further includes a processor and storage comprising stored instructions executable by the processor to perform an action on the hand-held computing device responsive to touch input detected by the sensor. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A sensor, comprising:
  a ground electrode comprising a plurality of spatially separated lines;
  a set of individually-indexed signal channels alternately interdigitated on a first elastomeric layer with the spatially separated lines of the ground electrode, each signal channel comprising a stretchable conductive path including a gallium-containing liquid metal;
  a second elastomeric layer encapsulating each signal channel; and
  a conductor extending from an exterior of the second elastomeric layer of a first signal channel of the set of individually-indexed signal channels, through the second elastomeric layer of the first signal channel, and contacting the gallium-containing liquid metal within the stretchable conductive path of the first signal channel.

2. The sensor of claim 1, wherein the gallium-containing liquid metal comprises eutectic gallium indium.

3. The sensor of claim 1, further comprising a conductor extending from an exterior of the second elastomeric layer of each signal channel of the set of individually-indexed signal channels, through the second elastomeric layer of each signal channel, and contacting the gallium-containing liquid metal.

4. The sensor of claim 1, wherein the conductor comprises one or more of silver nanowires and copper wire.

5. The sensor of claim 1, wherein one or more of the first elastomeric layer and the second elastomeric layer comprises one or more of a silicone elastomer and a latex elastomer.

6. The sensor of claim 1, wherein the stretchable conductive path comprises a solid conductive portion and a liquid conductive portion.

7. The sensor of claim 1, wherein the sensor is a first sensor, and further comprising a second sensor positioned vertically above the first sensor and comprising a second set of individually-indexed signal channels.

8. The sensor of claim 1, wherein the sensor is incorporated into a wearable computing device.

9. The sensor of claim 1, wherein the sensor is incorporated into a hand-held computing device.

10. The sensor of claim 1, wherein the sensor is incorporated into a fabric article.

11. A stretchable wearable article, comprising:
 a sensor coupled with the stretchable, wearable article, the sensor including a ground electrode comprising a plurality of spatially separated lines,
  a set of individually-indexed signal channels alternately interdigitated on a first elastomeric layer with the spatially separated lines of the ground electrode, each signal channel comprising a stretchable conductive path including a gallium-containing liquid metal,
  a second elastomeric layer encapsulating each signal channel, and
  a conductor extending from an exterior of the second elastomeric layer of a first signal channel, through the second elastomeric layer of the first signal channel, and contacting the gallium-containing liquid metal within the stretchable conductive path of the first signal channel.

12. The article of claim 11, wherein the article comprises fabric, and wherein the sensor is incorporated in the fabric.

13. The article of claim 11, wherein the sensor is configured to output information usable by an operatively-coupled computing device to determine a condition of a body part of a wearer of the article.

14. The article of claim 11, wherein the gallium-containing liquid metal comprises eutectic gallium indium, wherein the first elastomeric layer comprises silicone, and wherein the conductor comprises one or more of silver nanowires and copper wire.

15. A computing device, comprising:
 a soft, exterior surface; and
 a sensor positioned relative to the soft, exterior surface such that deformation pressure on the soft, exterior surface is detectable by the sensor, the sensor comprising
  a plurality of spatially separated lines of a ground electrode,
  a set of individually-indexed signal channels alternately interdigitated on a first elastomeric layer with the spatially separated lines, each signal channel comprising a stretchable conductive path including a gallium-containing liquid metal,
  a second elastomeric layer encapsulating each signal channel, and
  a conductor extending from an exterior of the second elastomeric layer of a first signal channel, through the second elastomeric layer of the first signal channel, and contacting the gallium-containing liquid metal within the stretchable conductive path of the first signal channel.

16. The device of claim 15, wherein the gallium-containing liquid metal comprises eutectic gallium indium, wherein the first elastomeric layer comprises silicone, and wherein the conductor comprises one or more of silver nanowires and copper wire.

17. The device of claim 15, further comprising a controller and a display device, wherein the soft, exterior surface is a surface of an adjustable band configured to mount the controller and display device, and wherein the sensor is located in the soft, exterior surface.

18. The device of claim 17, wherein the controller is configured to receive output from the sensor and output a notification to a wearer of the device when a tension of the adjustable band reaches a designated level of tension, the tension of the adjustable band determined based on the output from the sensor.

19. The device of claim 15, wherein the computing device is a hand-held computing device, and wherein the soft, exterior surface is a back surface of the hand-held computing device.

20. The device of claim 19, further comprising a processor and storage comprising stored instructions executable by the processor to perform an action on the hand-held computing device responsive to touch input detected by the sensor.

\* \* \* \* \*